United States Patent
Motohashi

(10) Patent No.: US 7,177,256 B2
(45) Date of Patent: Feb. 13, 2007

(54) INFORMATION RECORDING METHOD, INFORMATION RECORDING APPARATUS, PROGRAM AND COMPUTER READABLE INFORMATION STORAGE MEDIUM

(75) Inventor: Tsutomu Motohashi, Tokyo (JP)

(73) Assignee: Ricoh Company, Ltd. (JP)

( * ) Notice: Subject to any disclaimer, the term of this patent is extended or adjusted under 35 U.S.C. 154(b) by 0 days.

(21) Appl. No.: 10/947,279

(22) Filed: Sep. 23, 2004

(65) Prior Publication Data

US 2005/0044309 A1    Feb. 24, 2005

Related U.S. Application Data

(63) Continuation of application No. PCT/JP2004/003083, filed on Mar. 10, 2004.

(30) Foreign Application Priority Data

Mar. 25, 2003 (JP) .............................. 2003-083930
Jan. 21, 2004 (JP) .............................. 2004-013260

(51) Int. Cl.
*G11B 7/00* (2006.01)
(52) U.S. Cl. ..................................... 369/59.25; 369/94
(58) Field of Classification Search ............. 369/59.25, 369/94
See application file for complete search history.

(56) References Cited

U.S. PATENT DOCUMENTS

| 5,966,721 | A | 10/1999 | Hirayama et al. |
| 6,850,469 | B2 * | 2/2005 | Ogawa et al. ........... 369/47.22 |
| 2003/0095484 | A1 | 5/2003 | Motohashi |
| 2003/0202782 | A1 | 10/2003 | Motohashi et al. |
| 2004/0160867 | A1 | 8/2004 | Motohashi |
| 2004/0202076 | A1 | 10/2004 | Motohashi |

FOREIGN PATENT DOCUMENTS

| JP | 8-212561 | 8/1996 |
| JP | 9-7308 | 1/1997 |
| JP | 2000-48542 | 2/2000 |
| JP | 2000-285609 | 10/2000 |
| JP | 2001-126255 | 5/2001 |
| JP | 2003-16648 | 1/2003 |
| JP | 2003-168221 | 6/2003 |
| WO | WO-97/13365 | 4/1997 |

\* cited by examiner

*Primary Examiner*—Wayne Young
*Assistant Examiner*—Van T. Pham
(74) *Attorney, Agent, or Firm*—Dickstein Shapiro LLP

(57) ABSTRACT

In a method for writing data to an information recording medium having a plurality of recording layers, user data is written across between a plurality of the recording layers, and data other than the user data is written in a predetermined zone of the recording layer. Thereby, since the user data is written continuously upon switching of a recording layer without data other than the user data being written, it is possible to avoid interruption of writing of the user data to the recording layers.

19 Claims, 6 Drawing Sheets

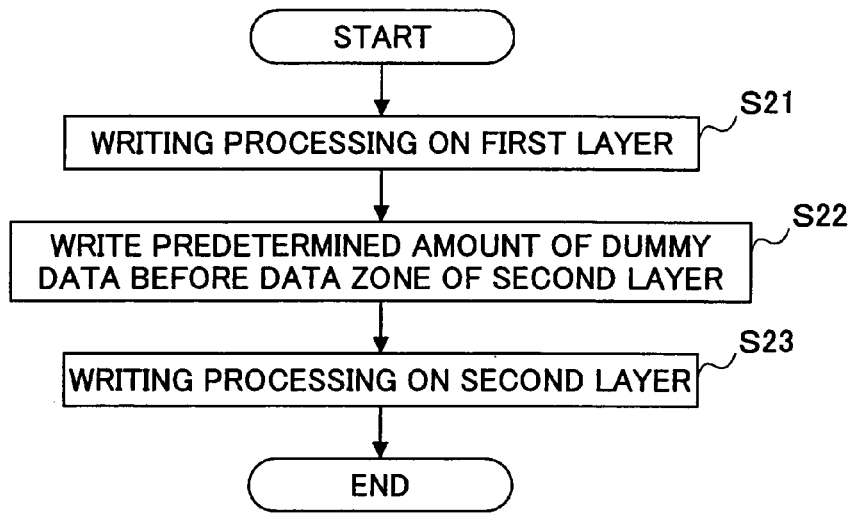

| (SECOND LAYER) | (WRITING DIRECTION→) | | |
|---|---|---|---|
| | LEAD-IN ZONE | DATA ZONE | LEAD-OUT ZONE |
| (FIRST LAYER) | LEAD-IN ZONE | DATA ZONE | LEAD-OUT ZONE |
| | (WRITING DIRECTION→) | | |

| (SECOND LAYER) | | (←WRITING DIRECTION) | |
|---|---|---|---|
| | LEAD-OUT ZONE | DATA ZONE | MIDDLE ZONE |
| (FIRST LAYER) | LEAD-IN ZONE | DATA ZONE | MIDDLE ZONE |
| | (WRITING DIRECTION→) | | |

INFORMATION RECORDING METHOD, INFORMATION RECORDING APPARATUS, PROGRAM AND COMPUTER READABLE INFORMATION STORAGE MEDIUM

CROSS-REFERENCE TO RELATED APPLICATION

This application is a U.S. continuation application filed under 35 USC 111(a) claiming benefit under 35 USC 120 and 365(c) of PCT application JP2004/003083, filed on Mar. 10, 2004, which claims priority of applications Ser. Nos. 2003-083930 and 2004-013260, filed in Japan on Mar. 25, 2003 and Jan. 21, 2004, respectively. The foregoing applications are hereby incorporated herein by reference.

BACKGROUND OF THE INVENTION

1. Field of the Invention

The present invention relates to an information recording method, an information recording apparatus, a program and a computer readable information storage medium for writing data to an information recording medium having a plurality of recording layers.

2. Description of the Related Art

Recently, along with improvement of the performance in a personal computer (PC), the personal computer becomes to be able to handle AV (Audio-Visual) information such as music, pictures or such. Since such AV information has a very large information size, an optical disk such as a DVD (Digital Versatile Disc) has taken attention as an information recording medium, and, along with price reduction thereof, an optical disk apparatus as an information recording/reproduction apparatuses have spread as peripheral devices for PCs.

As a DVD-ROM, there exist DVDs having single recording layers and DVDs each having two recording layers. However, as writeable recording-type DVDs, only DVD having single recording layers, such as DVD+R (Recordable), DVD–RW (Rewriteable), DVD-RAM (Random Access Memory) or such exist. Therefore, a recording-type double-layer DVD having two recording layers has been studied recently. This medium has a configuration such that, as a result of data being written thereto in the same manner as that in the DVD-ROM, it has a recording capacity same as that of the DVD-ROM, and also, it has a compatibility with the DVD-ROM.

A reproduction-only-type double-layer DVD has two types of track systems, i.e., a parallel track path system (PTP system) in which a track on a second layer has a direction from the central side to the peripheral side same as that in a track of a first layer, and an opposite track path system (OTP system) in which a track on a second layer has a direction from the peripheral side to the central side.

FIG. 12 generally shows a logical format of a recording-type double-layer DVD in the PTP system while FIG. 13 generally shows a logical format of a recording-type double-layer DVD in the OTP system. In FIGS. 12 and 13, the left hand corresponds to the central side of the optical disk while the right hand corresponds to the peripheral side of the optical disk.

As shown in FIG. 12, in each layer of a first recording layer and a second recording layer, from the central side of the optical disk, a lead-in zone (LEAD-IN ZONE), a data zone (DATA ZONE) and a lead-out zone (LEAD-OUT ZONE) are provided. In other words, in each layer of the first and second recording layers, data is written from the central side toward the peripheral side of the optical disk. It is noted that, in the PTP system, a radial position of an address at which the data zone starts is equal between the first and second layer. For example, each of both starts at a physical address of 30000H.

As shown in FIG. 13, in a first recording layer, from the central side of the optical disk, a lead-in zone (LEAD-IN ZONE), a data zone (DATA ZONE) and a middle zone (MIDDLE ZONE) are provided. In a second recording layer, from the peripheral side of the optical disk, a middle zone (MIDDLE ZONE), a data zone (DATA ZONE) and a lead-out zone (LEAD-OUT ZONE) are provided. In other words, in the first recording layer, data is written from the central side toward the peripheral side of the optical disk, while, in the second recording layer, data is written from the peripheral side toward the central side of the optical disk. It is noted that, in the OTP system, a radial position of an address at which the data zone starts in the second recording layer is equal to a radial position of an address at which the data zone ends in the first recording layer. Further, a physical address at which the data zone starts in the second recording layer is an address bit-inverted from an address at which the data zone ends in the first recording layer.

Thus, in the logical format in the recording-type double-layer DVD, the data other than the user data (for example, the lead-in (LEAD-IN) data, lead-out (LEAD-OUT) data, middle (MIDDLE) data or such) is written before or after the user data.

On the other hand, a technology of previously creating data to be written to a multilayer optical disk having a plurality of recording layers has been proposed. According to the technology, data to be written to a multilayer optical disk is previously created, and, upon switching of a recording layer, data other than user data (for example, lead-out data) is written (see Japanese Laid-open Patent Application No. 2000-48542).

SUMMARY OF THE INVENTION

However, in a recording-type multilayer optical disk, logically, a plurality of layers are treated as a single layer in a writing process. However, when data other than user data, for example, when data indicating layer switching or such is written during writing of the user data, the processing of writing of the user data to a recording layer is interrupted. In particular, in a case of a video recording occasion in which user data should be continuously written, interruption of the writing processing during the processing of writing of the user data for a long interval is problematic.

An object of the present invention is to avoid interruption of processing of writing user data to a recording layer.

Another object of the present invention is to enable reading of user data already written to a recording layer, at predetermined timing.

An information recording method according to the present invention for writing data into an information recording medium having a plurality of recording layers, includes a step of writing the data across between a plurality of the recording layers (continuously), and a step of, after writing the user data, writing data other than the user data to a predetermined zone of the recording layer.

According to the present invention, user data is writing across between the plurality of recording layers (continuously), and, after the completion of writing of the user data, the data indicating switching of the recording layer is written at a zone around the boundary of the recording layer. In other words, even at a portion at which the recording layer is switched, the data indicating switching of the recording layer is not written but the user data is written continuously without interruption. Accordingly, during this time, no interruption occurs in the processing of writing of the user data to the recording layer.

According to an information recording method in another aspect of the present invention, the information recording method for writing data to an information recording medium having a plurality of recording layers includes a step of writing data across between a plurality of recording layers skipping a zone around the boundary of the plurality of recording layers, and a step of, after writing the user data, writing data indicating switching the layer at the zone around the boundary.

According to the present invention, the user data is writing across between the plurality of recording layers (continuously), and, after the completion of writing of the user data, the data indicating switching of the recording layer is written at the zone around the boundary of the recording layer. In other words, even at a portion at which the recording layer is switched, the data indicating switching of the recording layer is not written but the user data is written continuously without interruption. Accordingly, during this time, no interruption occurs in the processing of writing of the user data to the recording layer.

Further, in the above-mentioned information recording methods, it is preferable that, the information recording medium is an information recording medium in which recording is carried out in the parallel track path (PTP) system; the zone around the boundary includes a lead-out zone (LEAD-OUT ZONE) in a first recording layer in which the user data has been written, and a lead-in zone (LEAD-IN ZONE) of a second recording layer in which the user data has been written across from the first recording layer; and the data indicating switching of the layer is lead-out (LEAD-OUT) data written in the lead-out zone of the first recording layer and lead-in (LEAD-IN) data written in the lead-in zone of the second recording layer.

Thus, after writing of the user data to the information recording medium in the PTP system, the lead-out data is written in the lead-out zone of the first recording layer, and then, the lead-in data is written in the lead-in zone of the second recording layer. As a result, in the information recording medium in the PTP system, upon switching of the recording layer, the data indicating switching of the recording layer is not written but the user data is written continuously (across between the two layers). Thereby, it becomes possible to avoid interruption of the processing of writing of the user data to the recording layer.

Alternatively, in the above-mentioned information recording methods, it is preferable that, the information recording medium is an information recording medium in which recording is carried out in the opposite track path (OTP) system; the zone around the boundary includes a middle zone (MIDDLE ZONE) in a first recording layer in which the user data has been written and a middle zone (MIDDLE ZONE) of a second recording layer in which the user data has been written across from the first recording layer; and the data indicating switching of the layer is middle (MIDDLE) data written in the middle zone of the first recording layer and middle (MIDDLE) data written in the middle zone of the second recording layer.

Thus, after writing of the user data to the information recording medium in the OTP system, the middle data is written in the middle zones in the first and second recording layers. As a result, in the information recording medium in the OTP system, upon switching of the recording layer, the data indicating switching of the recording layer is not written but the user data is written continuously (across between the two layers). Thereby, it becomes possible to avoid interruption of the processing of writing of the user data to the recording layer.

Further, in the information recording methods described above, in the step of writing the user data, it is preferable to write dummy data immediately before the data zone (DATA ZONE) of a recording layer to which writing is made subsequently, after writing the user data to the predetermined recording layer.

By thus writing the dummy data immediately before the data zone (DATA ZONE) of the recording layer to which recording is performed subsequently, after writing the user data in the predetermined recording layer, it becomes possible to read the user data written in the subsequent recording layer at predetermined timing even in a case where the lead-in (LEAD-IN) data in the PTP system or the middle (MIDDLE) data in the OTP system has not been written, for example, even in a case of so-called follow-up reproduction to reproduce the user data during writing of the user data, for example.

Furthermore, in the information recording methods, in the step of writing the user data, after writing the user data in the predetermined recording layer, it is preferable to write dummy data at a top of the data zone (DATA ZONE) of the recording layer to which writing is carried out subsequently.

By thus writing the dummy data at the top of the data zone (DATA ZONE) of the recording layer to which recording is performed subsequently after writing the user data in the predetermined recording layer, it becomes possible to read the user data written in the subsequent recording layer at predetermined timing even in a case where the lead-in (LEAD-IN) data in the PTP system or the middle (MIDDLE) data in the OTP system has not been written, for example, even in a case of so-called follow-up reproduction to reproduce the user data during writing of the user data, for example.

Further, in the information recording methods described above, in the step of writing the user data, it is preferable to write dummy data immediately before the data zone (DATA ZONE) of a recording layer to which writing is made subsequently, before writing the user data to the plurality of recording layers.

Since the dummy data is thus written before the user data is written to the recording layers, no time is required to write the dummy data at a portion of switching of the recording layer during writing of the user data. Accordingly, it is possible to positively avoid interruption of processing of writing of the user data to the recording layers.

Further, in the information recording methods described above, in the step of writing the user data, it is preferable to write dummy data at a top of the data zone (DATA ZONE) of a recording layer to which writing is made subsequently, before writing the user data to the plurality of recording layers.

Since the dummy data is thus written before the user data is written to the recording layers, no time is required to write the dummy data at a portion of switching of a recording layer during writing of the user data. Accordingly, it is possible to positively avoid interruption of the processing of writing of the user data to the recording layers.

Furthermore, it is possible to realize the present invention in a form of an information recording apparatus, an information recording program, or a computer readable information storage medium. Also in such a case, the above-mentioned information recording method should be carried out consequently, and thus, the same advantages can be obtained.

Thus, according to the present invention, an information recording method for writing data to an information recording medium having a plurality of recording layers includes a step of (continuously) writing user data across between a plurality of the recording layers and a step of, after writing the user data, writing data other than the user data in a predetermined zone of the recording layer. Thereby, since the data other than the user data is written in the predetermined zone in the recording layer after the user data is written across between the plurality of recording layers, the user data is continuously written without the data other than the user data being written upon switching of the recording layer. Accordingly, it is possible to avoid interruption of the processing of writing of the user data to the recording layers.

Further, an information recording method for writing data to an information recording medium having a plurality of recording layers includes a step of (continuously) writing user data across between a plurality of the recording layers skipping a zone around the boundary of the plurality of the recording layers and a step of, after writing the user data, writing data indicating switching the recording layer in the zone around the boundary. Thereby, since the data indicating switching of the recording layer is written in the zone around the boundary of the recording layers after the user data is written across between the plurality of recording layers, the user data is continuously written without the data other than the user data being written upon switching of the recording layer. Accordingly, it is possible to avoid interruption of processing of writing of the user data to the recording layers.

Further, a case is assumed where the information recording medium is an information recording medium such as that to which recording is performed in the parallel track path (PTP) system, the zone around the boundary includes the lead-out zone (LEAD-OUT ZONE) of the first recording layer in which the user data is written and the lead-in zone (LEAD-IN ZONE) of the second recording layer in which the user data is written across from the first recording layer, and the data indicating switching of the recording layer includes the lead-out (LEAD-OUT) data written in the lead-out zone of the first recording layer and the lead-in (LEAD-IN) data written in the lead-in zone of the second recording layer. In this case, after the user data is written in the information recording medium according to the PTP system, the lead-out data is written in the lead-out zone of the first recording layer, and the lead-in data is written in the lead-in zone of the second recording layer. Thereby, the user data is continuously (across between the two recording layers) written in the information recording medium according to the PTP system without the data indicating switching of the recording layer being written upon switching of the recording layer. As a result, it becomes possible to avoid interruption of the processing of writing the user data to the recording layers.

Further, another case is assumed where the information recording medium is an information recording medium such as that to which recording is performed in the opposite track path (OTP) system, the zone around the boundary includes the middle zone (MIDDLE ZONE) of the first recording layer in which the user data is written and the middle zone (MIDDLE ZONE) of the second recording layer in which the user data is written across from the first recording layer, and the data indicating switching of the recording layer includes the middle (MIDDLE) data written in the middle zone of the first recording layer and the middle (MIDDLE) data written in the middle zone of the second recording layer. In this case, after the user data is written in the information recording medium according to the OTP system, the middle data is written in the middle zone of the first recording layer, and the middle data is written in the middle zone of the second recording layer. Thereby, the user data is continuously (across between the two recording layers) written in the information recording medium according to the OTP system without the data indicating switching of the recording layer being written upon switching of the recording layer. As a result, it becomes possible to avoid interruption of processing of writing the user data to the recording layers.

Further, by writing dummy data immediately before the user data (USER DATA) of a recording layer to which writing is carried out subsequently after writing the user data in the predetermined recording layer in the above-mentioned step of writing the user data, it becomes possible to read the user data written in the subsequent recording layer at predetermined timing even in a case where the lead-in (LEAD-IN) data in the PTP system or the middle (MIDDLE) data in the OTP system has not been written, for example, even in a case of so-called follow-up reproduction to reproduce user data during writing of the user data, for example.

Further, by writing dummy data at a top of the user data (USER DATA) of a recording layer to which writing is carried out subsequently after writing the user data in the predetermined recording layer in the above-mentioned step of writing the user data, it becomes possible to read the user data written in the subsequent recording layer at predetermined timing even in a case where the lead-in (LEAD-IN) data in the PTP system or the middle (MIDDLE) data in the OTP system has not been written, for example, even in a case of so-called follow-up reproduction to reproduce user data during writing of the user data, for example.

Further, by writing dummy data immediately before the user data (USER DATA) of a recording layer to which writing is carried out subsequently before writing the user data in the plurality of recording layers in the above-mentioned step of writing the user data, no time is required to write the dummy data upon switching of a recording layer. Accordingly, it is possible to positively avoid interruption of processing of writing of the user data to the recording layers.

Further, by writing dummy data at a top of the user data (USER DATA) of a recording layer to which writing is carried out subsequently before writing the user data in the plurality of recording layers in the above-mentioned step of writing the user data, no time is required to write the dummy data upon switching of a recording layer. Accordingly, it is possible to positively avoid interruption of processing of writing of the user data to the recording layers.

Further, by configuring the dummy data to have a minimum necessary data size required for indicating the top of data or such, it is possible to control interruption required to write the dummy data to be a very small one. As a result, it becomes possible to carry out writing of the user data substantially without interruption.

BRIEF DESCRIPTION OF THE DRAWINGS

FIG. 5 shows a flow chart showing a flow of processing of writing according to a second embodiment of the present invention.

FIG. 6 roughly shows a position at which dummy data is written in the PTP system according to the second embodiment of the present invention.

FIG. 7 roughly shows a position at which dummy data is written in the OTP system according to the second embodiment of the present invention.

DETAILED DESCRIPTION OF THE PREFERRED EMBODIMENTS

Figure 1:
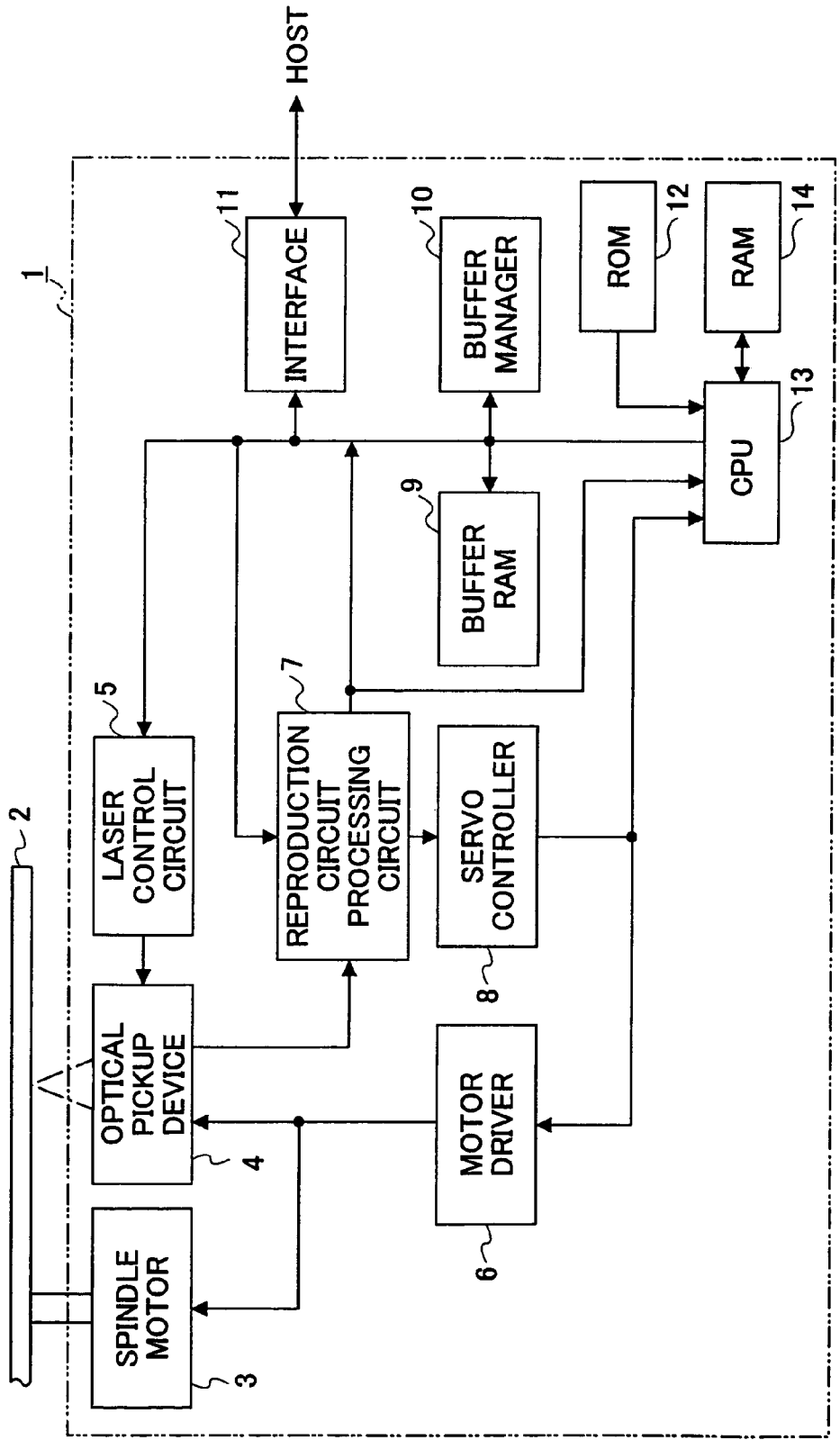
FIG. 1 shows a block diagram showing a general configuration of an optical disk apparatus as an information recording apparatus according to a first embodiment of the present invention.

A first embodiment of the present invention is described with reference to FIGS. 1 through 4. FIG. 1 is a block diagram showing a general configuration of an optical disk apparatus 1 as an information recording apparatus.

The optical disk apparatus 1 includes a spindle motor 3 rotating and driving an optical disk 2 as an information recording medium, an optical pickup device 4, a laser control circuit 5, a motor driver 6, a reproduction signal processing circuit 7, a servo controller 8, a buffer RAM 9, a buffer manager 10, an interface 11, a ROM 12, a CPU 13 and a RAM 14. Arrows shown in FIG. 1 show typical flows of signals or information, and do not show all the connection relationship between the respective blocks.

As the optical disk 2, a DVD as a recording-type multi-layer optical disk is applied. Specifically, the optical disk 2 is one having two recording layers.

The optical pickup device 4 includes a semiconductor laser as a light source, an optical system including an objective lens which leads laser light emitted from the semiconductor laser to a recording surface of the optical disk 2, and also, leads reflected light from the optical disk 2 to a predetermined light receiving position, a light receiving device disposed at the light receiving position and receiving the returned light and a driving system (focusing actuator, a tracking actuator, a seek motor and so forth)(not shown). From the light receiving device, an electronic current (electronic current signal) according to a light reception amount is output to the reproduction signal processing circuit 7.

The servo controller 8 generates a control signal controlling the focusing actuator in the optical pickup device 4 based on a focus error signal, and generates a control signal controlling the tracking actuator in the optical pickup device 4 based on a tracking error signal. These control signals are output to the motor driver 6 from the servo controller 8.

The motor driver 6 drives the focusing actuator and the tracking actuator in the optical pickup device 4 based on the control signals from the servo controller 8. The motor driver 6 controls the spindle motor 3 so that a line velocity of the optical disk 2 may be constant based on instructions from the CPU 13. Further, the motor driver 6 drives the seek motor in the optical pickup device 4 and moves the optical pickup device 4 toward a target track on the optical disk 2 in a radial direction based on instructions from the CPU 13.

Figure 2:
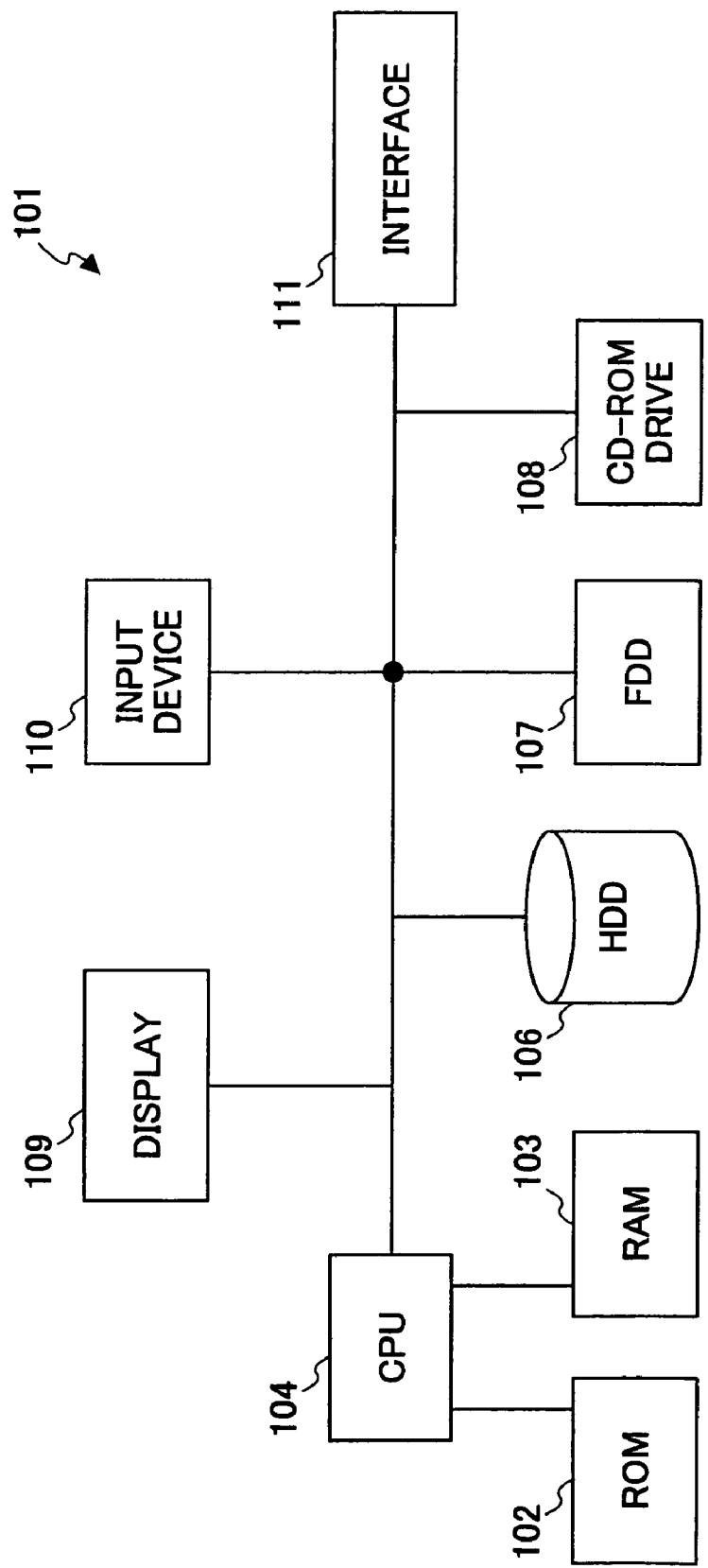
FIG. 2 shows a block diagram showing a general configuration of a PC connected to the optical disk apparatus.

The interface 11 acts as a bi-directional communication interface with a host (for example, a PC 101 as an information processing apparatus shown in FIG. 2) as an external apparatus, and is configured to conform to a standard interface such as an ATAPI, an SCSI or such The CPU 11 configures a microcomputer together with the ROM 12 and RAM 14 provided in the optical disk apparatus 1. In the ROM 12 which also acts as a storage medium, a program which includes a control program described later described in a code recognizable by the CPU 13 is stored. The CPU 13 controls operation of the respective parts described above, according to the program stored in the ROM 12, and also, temporarily stores data necessary for the control in the RAM 14. When power is turned on in the optical disk apparatus 1, the program stored in the ROM 12 is loaded (installed) in a main memory (not shown) of the CPU 13.

The PC 101 as an information processing apparatus is described next. The PC 101 is an abbreviation of a personal computer. FIG. 2 is a block diagram showing a general configuration of the PC 101 connected with the optical disk apparatus 1.

The PC 101 has a configuration such that respective parts are connected with a CPU 104 which configures a microcomputer together with a ROM 102 and a RAM 103 via a bus line 105. In the ROM 102, fixed data is fixedly recorded, while, in the RAM 103, variable data is recorded in a manner of being able to be changed. To the microcomputer, storage devices such as an HDD (hard disk drive), an FDD (flexible disk drive) and a CD-ROM drive 108 are connected via the bus line 105. In the HDD 106, an OS (operating system), various sorts of application programs and so forth are stored, part thereof is copied to the RAM 103 at a time of starting up, and is used by the CPU 104 to control the respective parts.

To the CPU 104, further a display 109, an input device 110 such as a keyboard, mouse and so forth, and an interface 111 are connected via the bus line 105. By means of the interface 111, connection with an external apparatus is made possible. For example, the above-described optical disk apparatus 1 is connected with the PC 101 via the interface 111.

Writing processing carried out by the CPU 13 based on the program stored in the ROM 12 is described with reference to FIGS. 3, 4, 12 and 13. User data written to the optical disk 2 in the writing processing includes, for example, video data including voice data, picture data and so forth (the same for the other embodiments).

Figure 3:
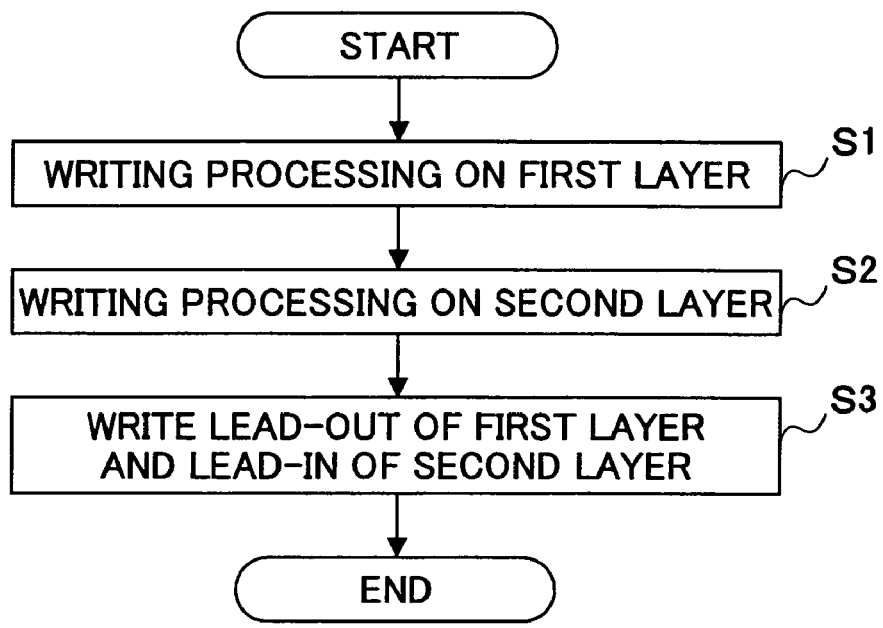
FIG. 3 shows a flow chart showing a flow of processing of writing according to the PTP system according to the first embodiment of the present invention.

FIG. 3 is a flow chart showing a flow of the writing processing according to the PTP system in the embodiment of the present invention. A method of writing data to the optical disk 2 in the writing processing according to the PTP system is described (see FIG. 12). As shown in FIG. 3, the CPU 13 first carries out processing of writing user data to a first recording layer (in Step S1). The user data is written in a data zone (DATA ZONE) in the first recording layer. After that, continuous to the processing of writing of the user data to the first recording layer, processing of writing of user data to a second recording layer is carried out (S2). The user data is written in a data zone (DATA ZONE) of the second recording layer continuous to the user data written to the data zone (DATA ZONE) of the first recording layer. In other words, the user data is written across between the first recording layer and the second recording layer. Then, after the writing of the user data to the second recording layer is completed, lead-out (LEAD-OUT) data is written to the first recording layer, and lead-in (LEAD-IN) data is written to the second recording layer (S3). The lead-out (LEAD-OUT) data is written in a lead-out zone (LEAD-OUT ZONE) in the first recording layer while the lead-in (LEAD-IN) data is written in a lead-in (LEAD-IN) zone in the second recording layer. After that, or simultaneously, the lead-in (LEAD-IN) data is written in a lead-in zone (LEAD-IN ZONE) in the first recording layer, while the lead-out (LEAD-OUT) data is written in a lead-out zone (LEAD-OUT ZONE) in the second recording layer. The lead-out zone in the first recording layer and the lead-in zone in the second recording layer act as around boundary zones, and the lead-out data and lead-in data acts as data indicating switching of the recording layers.

It is assumed that, before the above-mentioned writing processing is carried out, address information is built in the optical disk 2 in well-known wobble processing, and, further, an address range of the data zone is recorded for each recording layer in the lead-in zone. Therefore, the optical disk apparatus 1 which carries out the writing processing first reads out this information and thus recognizes the position of the data zone. Thereby, when the user data is written to the optical disk 2 continuously in Steps S1 and S2, the writing is carried out skipping the lead-in zone and the lead-out zone other than the data zone. This assumption is also applied to any other embodiments and variant embodiments of the present invention described later. In a case of writing processing according to the OTP system, writing is carried out skipping the lead-in zone, the lead-out zone and the middle zone other than the data zone.

Figure 4:
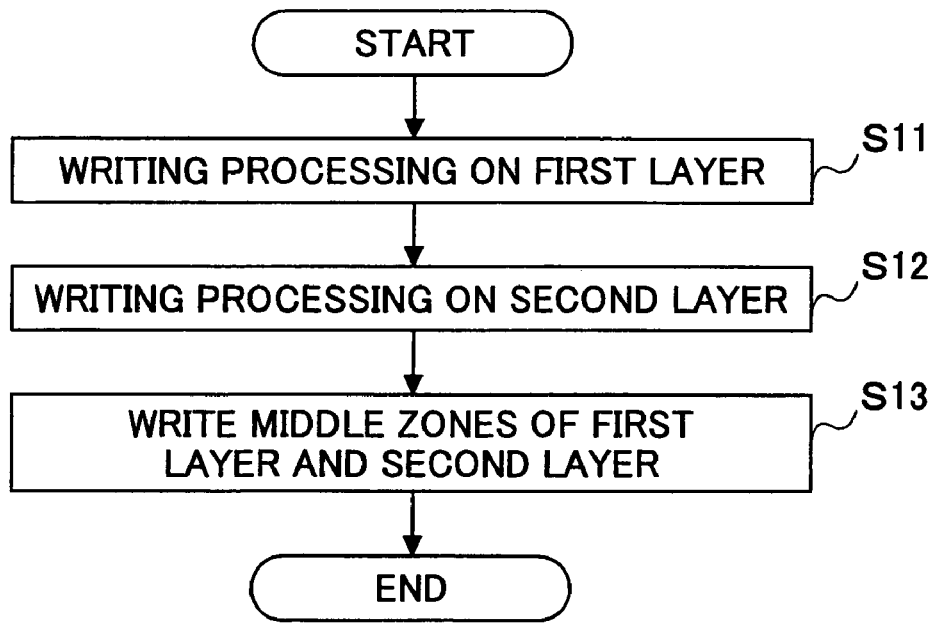
FIG. 4 shows a flow chart showing a flow of processing of writing according to the OTP system according to the first embodiment of the present invention.

FIG. 4 is a flow chart showing a flow of writing processing according to the OTP system in the embodiment of the present invention. An information recording method for writing data to the optical disk 2 in writing processing according to the OTP system is described (see FIG. 13). As shown in FIG. 4, the CPU 13 first carries out writing of user data to the first recording layer (in Step S11). The user data is written in a data zone (DATA ZONE) of the first recording layer. After that, continuously to the user data written to the first recording layer, user data is written to the second recording layer (S12). The user data is written to a data zone (DATA ZONE) of the second recording layer continuous to the user data written to the data zone (DATA ZONE) of the first recording layer. In other words, the user data is written across between the first recording layer and the second recording layer. After the writing of the user data to the second recording layer, middle (MIDDLE) data is written to the first recording layer, and middle (MIDDLE) data is written to the second recording layer (S13). The middle (MIDDLE) data is written to a middle zone (MIDDLE ZONE) of the first recording layer and to a middle zone (MIDDLE ZONE) of the second recording layer. After that, or simultaneously, the lead-in (LEAD-IN) data is written in a lead-in zone (LEAD-IN ZONE) of the first recording layer and the lead-out (LEAD-OUT) data is written in a lead-out zone (LEAD-OUT ZONE) of the second recording layer. The middle zone in the first recording layer and the middle zone in the second recording layer act as around boundary zones, and the middle data acts as data indicating switching of the recording layers.

Thus, according to the embodiment of the present invention, after the user data is written continuously to the data zones (DATA ZONES) of the first and second recording layers (across between the two recording layers), the data other than the user data (for example, the lead-in (LEAD-IN) data, the lead-out (LEAD-OUT) data, the middle (MIDDLE) data or such) is written. Thereby, the data other than the user data is not written upon switching from the first recording layer to the second recording layer but the user data is continuously written. As a result, it is possible to avoid interruption of the processing of writing of the user data to the recording layers.

The above-described control processing is carried out by the CPU 13 of the optical disk apparatus 1 according to the computer program recorded in the ROM 12 of the optical disk apparatus 1 as firmware, for example. In this case, the ROM 12 acts as storage medium storing therein the computer program.

Without limiting to the above-mentioned example, a configuration may be made such that, for example, according to the computer program copied to the RAM 103 at a time of starting up from the HDD 106, the CPU 104 in the PC 101 transmits operation instructions to the optical disk apparatus 1, and thereby, the same processing is carried out (the same for the other embodiments). In this case, the computer program copied to the RAM 103 of the PC 101 may be one stored in the HDD 106 in a form of an application program, or may be one incorporated in the OS. In a case where the application program is stored in the HDD 106, the application program is distributed in such a manner that it is recorded in a recording medium such as a CD-ROM or such. Then, the computer program is read out by means of the FDD 107 or the CD-ROM drive 108 in the PC 101, and then, is stored in the HDD 106. Therefore, in the example mentioned above, the HDD 106, the RAM 103, the FD, the CD-ROM or such acts as a storage medium storing therein the computer program.

In the two examples described above, the optical disk apparatus 1 or the PC 101 acts as a computer carrying out the processing according to the flow chart shown in FIG. 3 or FIG. 4 unique to the embodiment. However, it is not necessary to limit thereto, but a configuration may be provided such that such processing is carried out according to the computer program which is distributed to both the optical disk apparatus 1 and the PC 101. In any method, in a case where all or part of the control processing is carried out by the PC 101, the computer program is installed in the PC 101 whereby the optical disk apparatus 1 can carry out processing such as that shown in FIG. 3 or FIG. 4.

A second embodiment of the present invention is described with reference to FIGS. 5 through 11. The same reference numerals are given to parts same as those in the first embodiment, and description thereof is omitted.

A basic configuration of the present embodiment is approximately same as that in the first embodiment. Difference between the present embodiment and the first embodiment is a flow of writing processing. An information recording method for writing data to the optical disk 2 is described here.

FIG. 5 is a flow chart showing a flow of writing processing according to the present embodiment, FIG. 6 roughly illustrates a position to write dummy data according to the PTP system in the present embodiment, and FIG. 7 roughly illustrates a position to write dummy data according to the OTP system in the present embodiment. In FIGS. 6 and 7, the left hand corresponds to the central side in the optical disk 2 while the right hand corresponds to the peripheral side in the optical disk 2.

As shown in FIG. 5, first, the CPU 13 carries out processing of writing user data to a first recording layer (in Step S21). After that, immediately before a data zone (DATA ZONE) in a second recording layer, a predetermined size of dummy data (corresponding to half-tone-dot filled parts in FIGS. 6 and 7) is written (S22). For example, as shown in FIGS. 6 and 7, the predetermined size of dummy data is written immediately before the data zone (DATA ZONE). After the predetermined size of dummy data is written, processing of writing user data to the second recording layer is carried out (S23). The user data is written across between the first and second recording layers. Then, after writing of the user data to the second recording layer is completed, the CPU 13 carries out Step S3 in the PTP system or carries out Step S13 in FIG. 4 in the OTP system.

Figure 8:
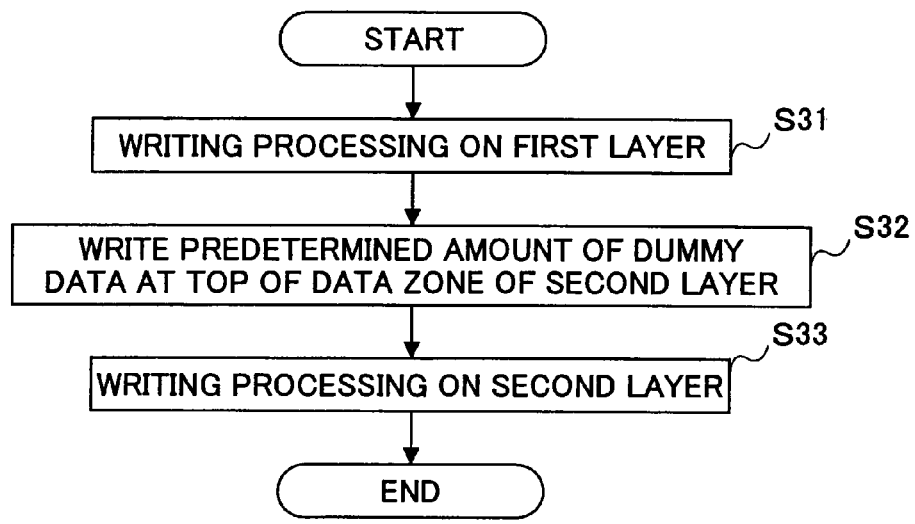
FIG. 8 shows a flow chart showing a flow of processing of writing according to a variant embodiment 1 of the second embodiment of the present invention.
Figure 9:
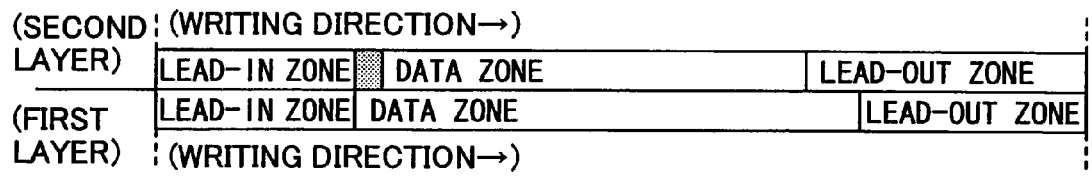
FIG. 9 roughly shows a position at which dummy data is written in the PTP system according to the variant embodiment 1 of the present invention.
Figure 10:
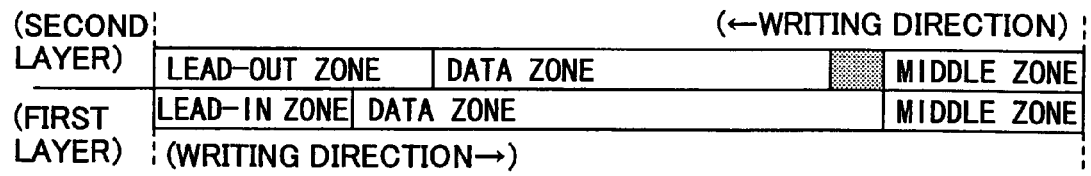
FIG. 10 roughly shows a position at which dummy data is written in the OTP system according to the variant embodiment 1 of the present invention.

FIG. 8 is a flow chart showing a flow of writing processing in a variant embodiment 1 of the present embodiment, and FIG. 9 roughly shows a position to write dummy data according to the PTP system in the variant embodiment 1, and FIG. 10 roughly shows a position to write dummy data according to the OTP system in the variant embodiment 1. In FIGS. 9 and 10, the left hand corresponds to the central side in the optical disk 2 while the right hand corresponds to the peripheral side in the optical disk 2.

As shown in FIG. 8, first, the CPU 13 carries out processing of writing user data to a first recording layer (in Step S31). After that, at a top of a data zone (DATA ZONE) in a second recording layer, a predetermined size of dummy data (corresponding to half-tone-dot filled parts in FIGS. 9 and 10) is written (S32). For example, as shown in FIGS. 9 and 10, the predetermined size of dummy data is written at the top of the data zone (DATA ZONE). After the predetermined size of dummy data is written, processing of writing user data to the second recording layer is carried out (S33). In detail, after the predetermined size of dummy is written, a position to start writing of the user data is shifted for the dummy data, and then, the user data is written. The user data is written across between the first and second recording layers. Then, after writing of the user data to the second recording layer is completed, the CPU 13 carries out Step S3 in the PTP system or carries out Step S13 in FIG. 4 in the OTP system.

Thus, according to the present embodiment and the variant embodiment 1 of the present invention, after the user data is written in the first recording layer, the dummy data is written immediately before or at the top of the user data to write on the second recording layer. Thereby, even when the lead-in (LEAD-IN) data in the PTP system or the middle (MIDDLE) data in the OTP system is not yet written, for example, even in a case of carrying out follow-up reproduction of reproducing the user data while writing the same, it is possible to detect the top of the user data written in the second recording layer by reading the dummy data, whereby it is possible to read out the user data written in the second recording layer at predetermined timing.

Figures 11, 12, 13:
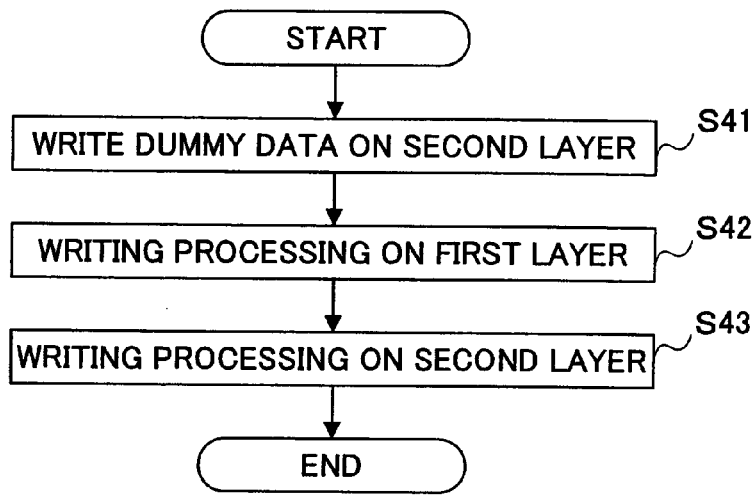
FIG. 11 shows a flow chart showing a flow of processing of writing according to a variant embodiment 2 of the second embodiment of the present invention.
FIG. 12 roughly shows a logical format in a recording-type double-layer DVD according to the PTP system.
FIG. 13 roughly shows a logical format in a recording-type double-layer DVD according to the OTP system.

FIG. 11 is a flow chart showing a flow of writing processing according to a variant embodiment 2 of the present embodiment. As shown in FIG. 11, first, the CPU 13 writes a predetermined size of dummy data (see FIGS. 6, 7, 9 and 10) immediately before a data zone (DATA ZONE) of a second recording layer, or at a top of the data zone (DATA ZONE) of the second recording layer (S41). After that, the CPU 13 carries out processing of writing user data to the first recording layer (S42), and carries out processing of writing user data to the second recording layer (S43). Then, after writing of the user data to the second recording layer is completed, the CPU 13 carries out Step S3 in the PTP system or carries out Step S13 in FIG. 4 in the OTP system.

Thus, according to the variant embodiment 2 of the present embodiment, by previously writing the dummy data before writing the user data to the recording layers, a time to write the dummy data is not necessary upon switching of the recording layers. Thereby, it is possible to positively avoid interruption of the processing of writing of the user data to the recording layers.

Embodiments of the present invention are not limited to those mentioned above and, other various embodiments are contrivable within the scope claimed in the claims below.

Further, the present application is based on Japanese Priority Patent Applications Nos. 2003-083930 and 2004-013260, filed on Mar. 25, 2003 and Jan. 21, 2004, respectively, and also, International (PCT) Patent Application No. JP2004/003083, the contents of which are thereby incorporated by reference.

What is claimed is:

1. A method for writing data to an information recording medium having a plurality of recording layers, the layers having at least a first layer and a second layer, the information recording medium to which recording is made being configured according to an opposite track path system, the method comprising the steps of:
   writing user data to an end location of a data zone in the first layer;
   writing a pre-determined amount of data other than user data immediately before a start location of a data zone in the second layer; and
   writing user data in said data zone in the second layer;
   wherein said method for writing data is performed according to said opposite track path system, such that a physical address of said start location of said data zone of said second layer is bit-inverted from a physical address of said end location of said data zone of said first layer, and
   wherein said step of writing a pre-determined amount of data other than user data immediately before a start location of a data zone in the second layer occurs just prior to the step of writing user data in the data zone in the second layer and just after the step of writing user data to an end location of the data zone in the first layer.

2. The information recording method as claimed in claim 1, wherein: said step of writing the data other than user data comprises writing a pre-determined amount of dummy data in a region immediately before said data zone in the second layer.

3. The information recording method as claimed in claim 1, further comprising the step of: writing data to a middle zone corresponding to at least one of said first and said second layers.

4. The information recording method as claimed in claim 3, wherein: the step of writing data to a middle zone comprises writing data to first and second middle zones corresponding to said first and second layers.

5. The information recording method as claimed in claim 4, wherein: the step of writing data to said first and second middle zones is performed after the steps of writing user data in data zones in the first and second layers.

6. An information recording apparatus for writing data to an information recording medium having at least first and second recording layers and being configured as an opposite track path system, the apparatus comprising:

a first writing part writing user data to an end location of a data zone in the first layer;
a second writing part writing a pre-determined amount of data other than user data immediately before a start location of a data zone in the second layer; and
a third writing part writing user data in said data zone in the second layer; and
wherein data writing is performed according to said opposite track path system, such that a physical address of said start location of said data zone of said second layer is bit-inverted from a physical address of said end location of said data zone of said first layer, and
wherein said second writing part writes the pre-determined amount of data other than user data immediately before the start location of the data zone in the second layer just after the first part writes user data to an end location of the data zone in the first layer.

7. The apparatus as claimed in claim 6, wherein said second writing part writes a pre-determined amount of dummy data in a region immediately before said data zone in the second layer.

8. The apparatus as claimed in claim 6, further comprising a fourth writing part writing data to a middle zone corresponding to at least one of said first and said second layers.

9. The apparatus as claimed in claim 8, wherein said fourth writing part writes data to first and second middle zones corresponding to said first and second layers.

10. The apparatus as claimed in claim 9, wherein said fourth writing part writes data to said first and second middle zones after the writing of user data in data zones in the first and second layers.

11. A method for writing data to an information recording medium having a plurality of recording layers, the layers having at least a first layer and a second layer, the method comprising the steps of:
writing user data in a data zone in the first layer;
writing a pre-determined amount of data other than user data immediately before a data zone in the second layer just after writing the user data in the data zone in the first layer; and
subsequently, writing user data in said data zone in the second layer.

12. The method of claim 11, wherein the step of writing a pre-determined amount of data other than user data comprises writing a pre-determined amount of dummy data.

13. The method of claim 12, wherein the step of writing a pre-determined amount of dummy data is performed in a middle zone for the second layer.

14. An information recording apparatus for writing data to an information recording medium having a plurality of recording layers, the layers having at least a first layer and a second layer, the apparatus comprising:
a first part writing user data in a data zone in the first layer;
a second part writing a pre-determined amount of data other than user data immediately before a data zone in the second layer just after said first part writes the user data in said data zone in the first layer; and
a third part subsequently writing user data in said data zone in the second layer.

15. The apparatus of claim 14, wherein said second part writes a pre-determined amount of dummy data.

16. The apparatus of claim 15, wherein said second part writes a pre-determined amount of dummy data in a middle zone for the second layer.

17. A method for writing data to an information recording medium having a plurality of recording layers, the layers having at least a first layer and a second layer, the information recording medium to which recording is made being configured according to an opposite track path system, the method comprising the steps of:
writing user data to an end location of a data zone in the first layer;
writing a pre-determined amount of data other than user data immediately before a start location of a data zone in the second layer;
writing user data in said data zone in the second layer;
writing data to a first and second middle zone corresponding to said first and said second layers,
wherein the step of writing data to said first and second middle zones is performed after the steps of writing user data in data zones in the first and second layers, and
wherein said method for writing data is performed according to said opposite track path system, such that a physical address of said start location of said data zone of said second layer is bit-inverted from a physical address of said end location of said data zone of said first layer.

18. The information recording method as claimed in claim 17, wherein writing data other than user data immediately before a data zone in the second layer occurs just after the step of writing user data in a data zone in the first layer.

19. An information recording apparatus for writing data to an information recording medium having at least first and second recording layers and being configured as an opposite track path system, the apparatus comprising:
a first writing part writing user data to an end location of a data zone in the first layer;
a second writing part writing a pre-determined amount of data other than user data immediately before a start location of a data zone in the second layer;
a third writing part writing user data in said data zone in the second layer; and
a fourth writing part writing data to a first and a second middle zone corresponding to said first and second layers after the first and second parts write user data in the data zones in the first and second layers,
wherein data writing is performed according to said opposite track path system, such that a physical address of said start location of said data zone of said second layer is bit-inverted from a physical address of said end location of said data zone of said first layer.

* * * * *